US011886284B2

United States Patent
Cai et al.

(10) Patent No.: US 11,886,284 B2
(45) Date of Patent: Jan. 30, 2024

(54) SYSTEM AND METHOD FOR DATA REDISTRIBUTION IN A DATABASE

(71) Applicant: Futurewei Technologies, Inc., Addison, TX (US)

(72) Inventors: Le Cai, Cupertino, CA (US); QingQing Zhou, Santa Clara, CA (US); Yang Sun, Palo Alto, CA (US)

(73) Assignee: Futurewei Technologies, Inc., Addison, TX (US)

( * ) Notice: Subject to any disclaimer, the term of this patent is extended or adjusted under 35 U.S.C. 154(b) by 0 days.

(21) Appl. No.: 17/746,841

(22) Filed: May 17, 2022

(65) Prior Publication Data

US 2022/0276922 A1 Sep. 1, 2022

Related U.S. Application Data

(63) Continuation of application No. 16/737,534, filed on Jan. 8, 2020, now Pat. No. 11,334,422, which is a
(Continued)

(51) Int. Cl.
*G06F 11/07* (2006.01)
*G06F 16/11* (2019.01)
(Continued)

(52) U.S. Cl.
CPC ........ *G06F 11/0793* (2013.01); *G06F 11/079* (2013.01); *G06F 11/0709* (2013.01);
(Continued)

(58) Field of Classification Search
CPC ............ G06F 11/0793; G06F 11/0709; G06F 11/0751; G06F 11/0787; G06F 11/079;
(Continued)

(56) References Cited

U.S. PATENT DOCUMENTS

| 8,230,426 B2 | 7/2012 | Powers et al. |
| 9,020,802 B1 | 4/2015 | Florissi et al. |

(Continued)

FOREIGN PATENT DOCUMENTS

| CN | 1864137 A | 11/2006 |
| CN | 105190533 A | 12/2015 |

(Continued)

OTHER PUBLICATIONS

"U.S. Appl. No. 15/227,546, 312 Amendment filed Dec. 11, 2019", 6 pgs.
(Continued)

*Primary Examiner* — Yair Leibovich
(74) *Attorney, Agent, or Firm* — Schwegman Lundberg & Woessner, P.A.

(57) ABSTRACT

A method for data redistribution of a job data in a first datanode (DN) to at least one additional DN in a Massively Parallel Processing (MPP) Database (DB) is provided. The method includes recording a snapshot of the job data, creating a first data portion in the first DN and a redistribution data portion in the first DN, collecting changes to a job data copy stored in a temporary table, and initiating transfer of the redistribution data portion to the at least one additional DN.

20 Claims, 14 Drawing Sheets

Related U.S. Application Data continuation of application No. 15/227,546, filed on Aug. 3, 2016, now Pat. No. 10,545,815.

(51) Int. Cl.
  *G06F 16/25* (2019.01)
  *G06F 16/27* (2019.01)
  *G06F 11/14* (2006.01)

(52) U.S. Cl.
  CPC ...... *G06F 11/0751* (2013.01); *G06F 11/0787* (2013.01); *G06F 11/1451* (2013.01); *G06F 11/1464* (2013.01); *G06F 11/1469* (2013.01); *G06F 16/128* (2019.01); *G06F 16/258* (2019.01); *G06F 16/27* (2019.01); *G06F 2201/80* (2013.01); *G06F 2201/84* (2013.01)

(58) Field of Classification Search
  CPC ............ G06F 11/1451; G06F 11/1464; G06F 11/1469; G06F 16/128; G06F 16/258; G06F 16/27; G06F 2201/80; G06F 2201/84
  USPC ......................................................... 714/16
  See application file for complete search history.

(56) References Cited

U.S. PATENT DOCUMENTS

| | | | |
|---|---|---|---|
| 9,424,160 | B2 | 8/2016 | Caufield et al. |
| 9,817,703 | B1 | 11/2017 | Ryland et al. |
| 10,545,815 | B2 * | 1/2020 | Cai ..................... G06F 11/0751 |
| 11,334,422 | B2 | 5/2022 | Cai et al. |
| 2002/0091748 | A1 | 7/2002 | Rehg et al. |
| 2004/0098447 | A1 | 5/2004 | Verbeke et al. |
| 2005/0033720 | A1 | 2/2005 | Verma et al. |
| 2007/0174541 | A1 * | 7/2007 | Chandrasekaran ......................... G06F 12/0866 711/E12.027 |
| 2007/0233683 | A1 | 10/2007 | Verma et al. |
| 2009/0083390 | A1 * | 3/2009 | Abu-Ghazaleh ........ H04L 47/70 709/209 |
| 2010/0050181 | A1 | 2/2010 | Zhang |
| 2011/0321056 | A1 | 12/2011 | Branson et al. |
| 2012/0017218 | A1 | 1/2012 | Branson et al. |
| 2012/0159506 | A1 | 6/2012 | Barham et al. |
| 2012/0197866 | A1 | 8/2012 | Xu |
| 2014/0181831 | A1 | 6/2014 | Le Scouarnec et al. |
| 2014/0279900 | A1 | 9/2014 | Gupta et al. |
| 2014/0279986 | A1 | 9/2014 | Mupparti et al. |
| 2015/0269006 | A1 | 9/2015 | Caufield et al. |
| 2015/0379430 | A1 | 12/2015 | Dirac et al. |
| 2017/0223097 | A1 | 8/2017 | Zhang et al. |
| 2018/0039534 | A1 | 2/2018 | Cai et al. |
| 2020/0210273 | A1 | 7/2020 | Cai et al. |

FOREIGN PATENT DOCUMENTS

| | | |
|---|---|---|
| WO | 2016095791 A1 | 6/2016 |
| WO | 2016116052 A1 | 7/2016 |

OTHER PUBLICATIONS

"U.S. Appl. No. 15/227,546, Amendment under 37 C.F.R. Sec. 1.312 filed Dec. 11, 2019", 6 pgs.
"U.S. Appl. No. 15/227,546, Final Office Action dated Aug. 2, 2018", 7 pgs.
"U.S. Appl. No. 15/227,546, Non-Final Office Action dated Feb. 23, 2018", 6 pgs.
"U.S. Appl. No. 15/227,546, Non-Final Office Action dated Mar. 7, 2019", 5 pgs.
"U.S. Appl. No. 15/227,546, Notice of Allowance dated Sep. 11, 2019", 8 pgs.
"U.S. Appl. No. 15/227,546, PTO Response to Rule 312 Communication dated Dec. 19, 2019", 2 pgs.
"U.S. Appl. No. 15/227,546, RCE and Response filed Nov. 1, 2018 to Final Office Action dated Aug. 2, 2018", 17 pgs.
"U.S. Appl. No. 15/227,546, Response filed May 22, 2018 to Non-Final Office Action dated Feb. 23, 2018", 10 pgs.
"U.S. Appl. No. 15/227,546, Response filed Jun. 5, 2019 to Non-Final Office Action dated Mar. 7, 2019", 9 pgs.
"U.S. Appl. No. 16/737,534, Non Final Office Action dated Jun. 24, 2021", 6 pgs.
"U.S. Appl. No. 16/737,534, Notice of Allowance dated Jan. 18, 2022", 9 pgs.
"U.S. Appl. No. 16/737,534, Preliminary Amendment filed Mar. 24, 2020", 7 pgs.
"U.S. Appl. No. 16/737,534, Response filed Sep. 22, 2021 to Non Final Office Action dated Jun. 24, 2021", 10 pgs.
"Chinese Application Serial No. 201780048560.6, First Office Action and Search Report dated Apr. 2, 2020", 14 pgs.
"European Application No. 21163981.0, Communication pursuant to Article 94(3) EPC dated May 12, 2023", (dated May 12, 2023), 6 pgs.
"European Application Serial No. 17836257.0, extended European Search Report dated May 8, 2019", 8 pgs.
"European Application Serial No. 17836257.0, Office Action dated May 24, 2019", 1 pg.
"European Application Serial No. 17836257.0, Response filed Sep. 21, 2020", 5 pgs.
"European Application Serial No. 17836257.0, Response filed Nov. 29, 2019 to Office Action dated May 24, 2019", 18 pgs.
"European Application Serial No. 17836257.0, Result of Consultation mailed Sep. 18, 2020", 5 pgs.
Alliez, Pierre, et al., "Isotropic Surface Remeshing", Proceedings of the Shape Modeling International 2003 (SMI'03), (2003), 10 pgs.
Luebke, David P., "A Developer's Survey of Polygonal Simplification Algorithms", IEEE Computer Graphics and Applications, May/Jun. 2001, (May 2001), 24-35.
Turk, Greg, et al., "Re-Tiling Polygonal Surfaces", Computer Graphics, 26, 2, Jul. 1992, SIGGRAPH '92 Chicago, Jul. 26-31, 1992, (Jul. 26, 1992), 55-64.
Dicionary definition of computer replication, retrieved from https://en.wikipedia.org/wiki/Replication_(computing) (Year: 2018).

* cited by examiner

MPP DB Before Data Redistribution

Additional Processing Capability Provided

Data is Split Up in Preparation for Redistribution

Snapshot is Captured before Redistribution Begins

Data Change Occurs Before/During Redistribution

Data Portion is moved to DN2

Changes Captured in Temp. Table are Moved

SYSTEM AND METHOD FOR DATA REDISTRIBUTION IN A DATABASE

RELATED APPLICATION

This application is a continuation of U.S. patent application Ser. No. 16/737,534 filed on 8 Jan. 2020, which is a continuation of and claims the benefit of priority to U.S. application Ser. No. 15/227,546, filed 3 Aug. 2016, which application is incorporated by reference as if reproduced herein and made a part hereof in its entirety, and the benefit of priority of which is claimed herein.

TECHNICAL FIELD

Embodiments of the present disclosure relate generally to data processing and, more particularly, but not by way of limitation, to a method and system for data redistribution in a database.

BACKGROUND

Massively parallel processing (MPP) is a coordinated processing of a program by multiple processors working on different parts of a program. Each processor may have its own operating system and memory. The use of MPP speeds the performance of huge databases that deal with massive amounts of data. A MPP database (MPP DB) can use multi-core processors, multiple processors and servers, and/or storage appliances equipped for parallel processing. That combination enables reading and processing many pieces of data across many processing units at the same time for enhanced speed.

MPP DB systems can include a large number of processors, servers, or other DB devices that are operated and regulated by a management system or systems. In order to simplify MPP DB management, the DB devices can be grouped into clusters, where an individual cluster can include an interface for communicating with the management system. A cluster can operate semi-autonomously.

If a failure occurs to one or more MPP DB devices, the quality of service will be affected. A cluster may include thousands of servers. The failure rate becomes higher as clusters grow larger. Server failures happen frequently, and may even reach once per week or once per day for a large cluster.

In MPP DB, data can be partitioned across multiple servers or nodes, with each server or node having memory and/or processors to locally process the data. All communication between DB devices/systems is via network interconnections. A MPP DB scales out the processing of a large job by distributing data to multiple servers, and running individual transaction portions in the multiple servers.

SUMMARY

In some example embodiments, a method for data redistribution of a job data in a first datanode (DN) to at least one additional DN in a Massively Parallel Processing (MPP) Database (DB) is provided. The method includes recording a snapshot of the job data, creating a first data portion in the first DN and a redistribution data portion in the first DN, collecting changes to a job data copy stored in a temporary table, and initiating transfer of the redistribution data portion to the at least one additional DN.

In some examples of the method, the collecting the changes comprises collecting the changes to a first DN data changes stored in the temporary table and to a redistribution data changes stored in the temporary table.

In some examples of the method, the snapshot is used to determine the first DN data changes and the redistribution data changes stored in the temporary table.

In some examples of the method, the method further comprises, if transferring the redistribution data portion to the at least one additional DN succeeds, merging first DN data changes from the temporary table into the first data portion in the first DN; and indicating the first DN can continue processing.

In some examples of the method, the method further comprises, if transferring the redistribution data portion to the at least one additional DN succeeds, merging redistribution data changes from the temporary table into the at least one additional DN; and indicating the at least one additional DN is ready to begin processing.

In some examples of the method, the method further comprises, if transferring the redistribution data portion to the at least one additional DN fails, merging first DN data changes from the temporary table into the first data portion in the first DN; merging redistribution data changes from the temporary table into the redistribution data portion in the first DN; and indicating the first DN is ready to re-initiate processing in the first DN.

In some examples of the method, the method further comprises, if transferring the redistribution data portion to the at least one additional DN fails, merging first DN data changes from the temporary table into the first data portion in the first DN; merging redistribution data changes from the temporary table into the redistribution data portion in the first DN; and re-trying the data redistribution.

In some examples of the method, the method further comprises, if transferring the redistribution data portion to the at least one additional DN succeeds, identifying first DN data changes in the temporary table using the snapshot; merging the first DN data changes into the first data portion in the first DN; and indicating the first DN can continue processing.

In some examples of the method, the method further comprises, if transferring the redistribution data portion to the at least one additional DN succeeds, identifying redistribution data changes in the temporary table using the snapshot; merging the redistribution data changes into the redistribution data portion in the at least one additional DN; and indicating the at least one additional DN is ready to begin processing.

In some examples of the method, the method further comprises, if transferring the redistribution data portion to the at least one additional DN fails, identifying first DN data changes in the temporary table using the snapshot; merging the first DN data changes into the first data portion in the first DN; identifying redistribution data changes in the temporary table using the snapshot; merging the redistribution data changes into the redistribution data portion in the first DN; and indicating the first DN is ready to re-initiate processing in the first DN.

In some examples of the method, if transferring the redistribution data portion to the at least one additional DN fails, re-trying the data redistribution.

In some examples of the method, the method further comprises, if transferring the redistribution data portion to the at least one additional DN fails, identifying first DN data changes in the temporary table using the snapshot; merging the first DN data changes into the first data portion in the first DN; identifying redistribution data changes in the temporary table using the snapshot; merging the redistribution data changes into the redistribution data portion in the first DN; and re-trying the data redistribution.

In some examples of the method, the job data comprises the first data portion and the redistribution data portion.

In some examples of the method, the job data comprises the redistribution data portion.

In some example embodiments of the device, a device for data redistribution of a job data in a first datanode (DN) to at least one additional DN in a Massively Parallel Processing (MPP) Database (DB) is provided. The device includes a non-transitory memory storage comprising instructions and one or more processors in communication with the memory. The one or more processors execute the instructions to record a snapshot of the job data, create a first data portion in the first DN and a redistribution data portion in the first DN, collect changes to a job data copy stored in a temporary table, and initiate transfer of the redistribution data portion to the at least one additional DN.

In some examples of the device, the collecting the changes comprises collecting the changes to a first DN data changes stored in the temporary table and to a redistribution data changes stored in the temporary table.

In some examples of the device, the snapshot is used to determine the first DN data changes and the redistribution data changes stored in the temporary table.

In some examples of the device, the one or more processors are further configured to, if transferring the redistribution data portion to the at least one additional DN succeeds, merging first DN data changes from the temporary table into the first data portion in the first DN; and indicating the first DN can continue processing.

In some examples of the device, the one or more processors are further configured to, if transferring the redistribution data portion to the at least one additional DN succeeds, merging redistribution data changes from the temporary table into the at least one additional DN; and indicating the at least one additional DN is ready to begin processing.

In some examples of the device, the one or more processors are further configured to, if transferring the redistribution data portion to the at least one additional DN fails, merging first DN data changes from the temporary table into the first data portion in the first DN; merging redistribution data changes from the temporary table into the redistribution data portion in the first DN; and indicating the first DN is ready to re-initiate processing in the first DN.

In some examples of the device, the one or more processors are further configured to, if transferring the redistribution data portion to the at least one additional DN fails, merging redistribution data changes from the temporary table into the at least one additional DN; and indicating the at least one additional DN is ready to begin processing.

In some examples of the device, the one or more processors are further configured to, if transferring the redistribution data portion to the at least one additional DN succeeds, identifying first DN data changes in the temporary table using the snapshot; merging the first DN data changes into the first data portion in the first DN; and indicating the first DN can continue processing.

In some examples of the device, the one or more processors are further configured to, if transferring the redistribution data portion to the at least one additional DN succeeds, identifying redistribution data changes in the temporary table using the snapshot; merging the redistribution data changes into the redistribution data portion in the at least one additional DN; and indicating the at least one additional DN is ready to begin processing.

In some examples of the device, the one or more processors are further configured to, if transferring the redistribution data portion to the at least one additional DN fails, identifying first DN data changes in the temporary table using the snapshot; merging the first DN data changes into the first data portion in the first DN; identifying redistribution data changes in the temporary table using the snapshot; merging the redistribution data changes into the redistribution data portion in the first DN; and indicating the first DN is ready to re-initiate processing in the first DN.

In some examples of the device, if transferring the redistribution data portion to the at least one additional DN fails, re-trying the data redistribution.

In some examples of the device, the one or more processors are further configured to, if transferring the redistribution data portion to the at least one additional DN fails, identifying first DN data changes in the temporary table using the snapshot; merging the first DN data changes into the first data portion in the first DN; identifying redistribution data changes in the temporary table using the snapshot; merging the redistribution data changes into the redistribution data portion in the first DN; and re-trying the data redistribution to the at least one additional DN.

In some examples of the device, the job data comprises the first data portion and the redistribution data portion.

In some examples of the device, the job data comprises the redistribution data portion.

BRIEF DESCRIPTION OF THE DRAWINGS

Various ones of the appended drawings illustrate example embodiments of the present disclosure and cannot be considered as limiting the scope of the disclosure.

Figure 1:
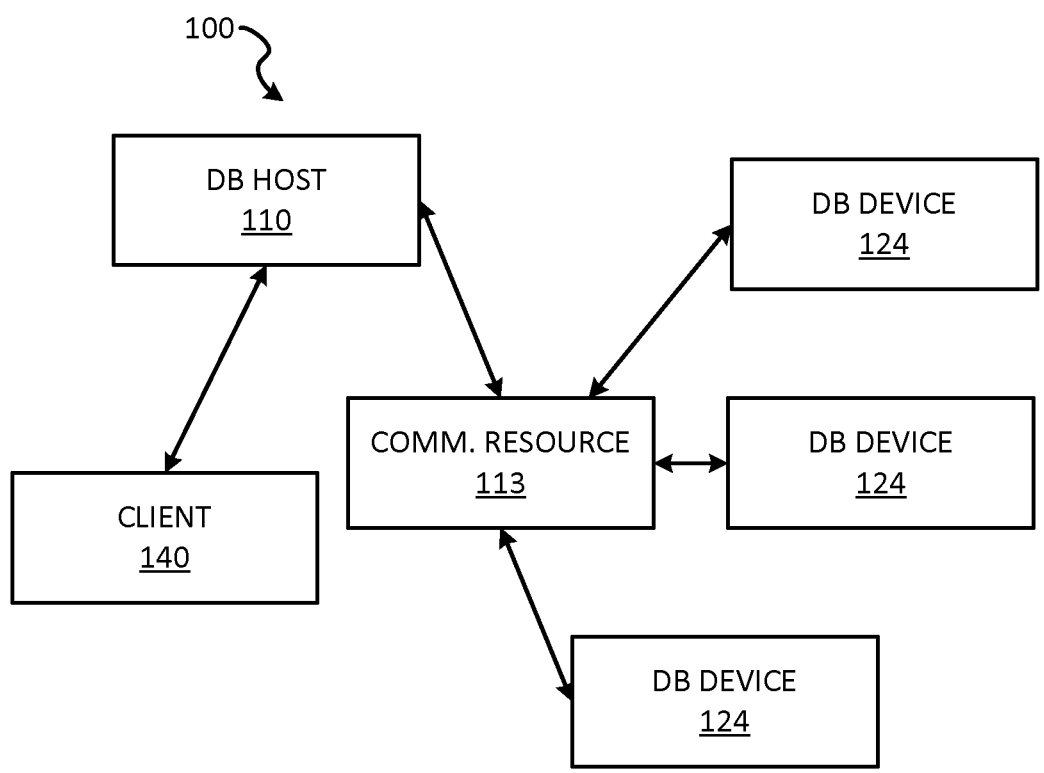
FIG. 1 is an example of a MPP DB.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The embodiments disclosed herein provide a data redistribution operation in a MPP DB. The data redistribution operation may be performed as a single transaction. A transaction, in the context of a database, is a sequence of operations performed as a single logical unit of work, which is independently executed for data retrieval or updates. A transaction may be an atomic union or other operations that are performed between system components in a network. In relational databases, to qualify as a transaction, four properties must be exhibited. The operation must be atomic, consistent, isolated and durable, summarized as the ACID acronym.

In data systems, atomicity (or atomicness) means undividable, which is one of the ACID transaction properties. An atomic transaction is an undividable and irreducible series of database operations such that either all occur, or nothing occurs. Example of atomic transaction is a monetary transfer from bank account A to account B. It consists of two operations, withdrawing the money from account A and saving it to account B. If the account A withdrawal fails, the account B deposit cannot occur. Consequently, the monetary transfer only succeeds if both the account A withdrawal and the account B deposit are successful. Performing these operations in an atomic transaction ensures that the database remains in a consistent state, that is, money is not lost if either of those two operations fail.

Typically, systems implement atomicity by providing some mechanism to indicate which transactions have started and which have finished. Alternatively, atomicity has been provided by keeping a copy of the data before any changes occurred, for example a read-copy-update procedure.

An instance is a process or running entity of a computer program, which has been allocated address space, CPU time, and other associated resources. The address space can be, for example, the address space of a virtual memory. In a MPP DB, an instance can be a database process, such as, a coordinator node (CN), a datanode (DN), a coordinator instance, a data instance, or a datanode instance. A node may comprise an instance or a process, rather than a physical server. A database instance provides functions to implement and/or manage a database function or functions. Instances running in multiple servers work together to complete one or more database operations. A physical server can run multiple instances or nodes such as a coordinator node or a data node. A MPP DB running multiple instances to achieve a processing job comprises multi-threaded processing.

A multi-threading programming model is widely used in MPP DB management systems. In addition monitoring and/or taking actions to prevent a server failure, the multi-threading programming model may also lead to less isolation among operations. A decrease in the isolation among operations can lead to more frequent instance failure, as a failure in one processing thread can cause failure in other threads due to data being exchanged between processing threads, for example. Alternatively, database operations may fail due to local resource confliction, such as lock timeout or buffer not available. Such failures often occur to only a few instances, but any instance failure (or a crash of a server running an instance or instances) will cause a database operation to fail, no matter how many survival instances have already completed their portions of the processing. Such a "one fails, all fail" model is very inefficient in a large-scale data processing.

FIG. 1 is an example of a MPP DB 100. The MPP DB 100 comprises a DB host 110, a communication resource 113, and one or more DB devices 124. The DB host 110 communicates with the one or more DB devices 124 via the communication resource 113. The communication resource 113 comprises a communication link, facility, network or networks, or other suitable communication resource. The DB host 110 in some embodiments receives database operations from a client 140. The DB host 110 performs subsequent database operations, including initiating, monitoring, and/or controlling DB operations, for example. The database host 110 in some embodiments sends database queries and other database operation commands to the one or more DB devices 124. The database host 110 in some embodiments generates database queries or commands and determines which DB devices 124 of the one or more DB devices 124 will be used to satisfy the query or command.

Each DB device 124 may store one or more portions of a job data. However, there is often no user data stored by the DB host 110. Instead, the DB host 110 may store metadata about the one or more DB devices 124 and/or about job data stored on or to be processed by the one or more DB devices 124. The DB host 110 may include system tables.

A client 140 can be various entities or people which can mean a person, a group of people, one or more computers, or the like. The client 140 can access the MPP DB through an electronic device, for example a mobile device, computer, smartphone, tablet, pad, etc.

All servers, devices, or programming instances in the MPP DB 100 can be called a node of the MPP DB 100. For example a coordinator node can be a kind of the interconnecting switch, a datanode can be a kind of the segment host for the MPP DB. A single physical machine, such as a server device, can host one or more virtual machines and/or program instances, including multiple virtual machines and/or multiple program instances.

When processing a query, in some embodiments each node works on one of rows in a table that the node has locally stored, and then each node may pass the result back to the coordinator node (CN). The result from each node may be a portion of the entire result. The CN can combine all the results from all the nodes into a final result set.

Data redistribution is one of the main characteristics of MPP DB processing. Job data is distributed across multiple database devices and/or programming instances to achieve data and processing parallelism. Evenly distributing the job data across the multiple database devices and/or programming instances can provide efficient operation and can minimize processing time. The job data distribution is typically achieved by creating a database table.

The job data may need to be redistributed, including after the job processing has begun. Data redistribution, however, has unique challenges and difficulties. In some examples, the job processing may need to be halted during redistribution. However, this is costly and the lost processing time is highly undesirable. Alternatively, if the job processing is not halted, then changes in the job data may not be accurately or completely captured, leading to a failure of the data redistribution. A failure of data redistribution in a single device, node, or processing instance can lead to failure in other devices, nodes, or processing instances where data and/or results are shared, even minimally.

SQL is a special-purpose programming language designed for communicating with a database, for managing data held in a relational database management system (RDBMS), or for stream processing in a relational data stream management system (RDSMS). The SQL language is subdivided into several language elements, including for example, clauses, expressions, predicates, queries, and statements. Clauses are constituent components of statements and queries. In some cases, clauses are optional. Expressions can produce scalar values or can produce tables consisting of columns and rows of data. Predicates specify conditions that can be evaluated to SQL three-valued logic (3VL) (true/false/unknown) or Boolean truth values. Predicates are used to limit the effects of statements and queries or to change program flow. Queries are an important element of SQL, and retrieve data based on specific criteria. Statements may have a persistent effect on schemata and data, or may control transactions, program flow, connections, sessions, or diagnostics. For example, SQL statements may be used to perform tasks such as update data on a database, or retrieve data from a database. By using a proper language selection of SQL for data redistribution in MPP DB, data is automatically distributed across segment databases.

Figure 2:
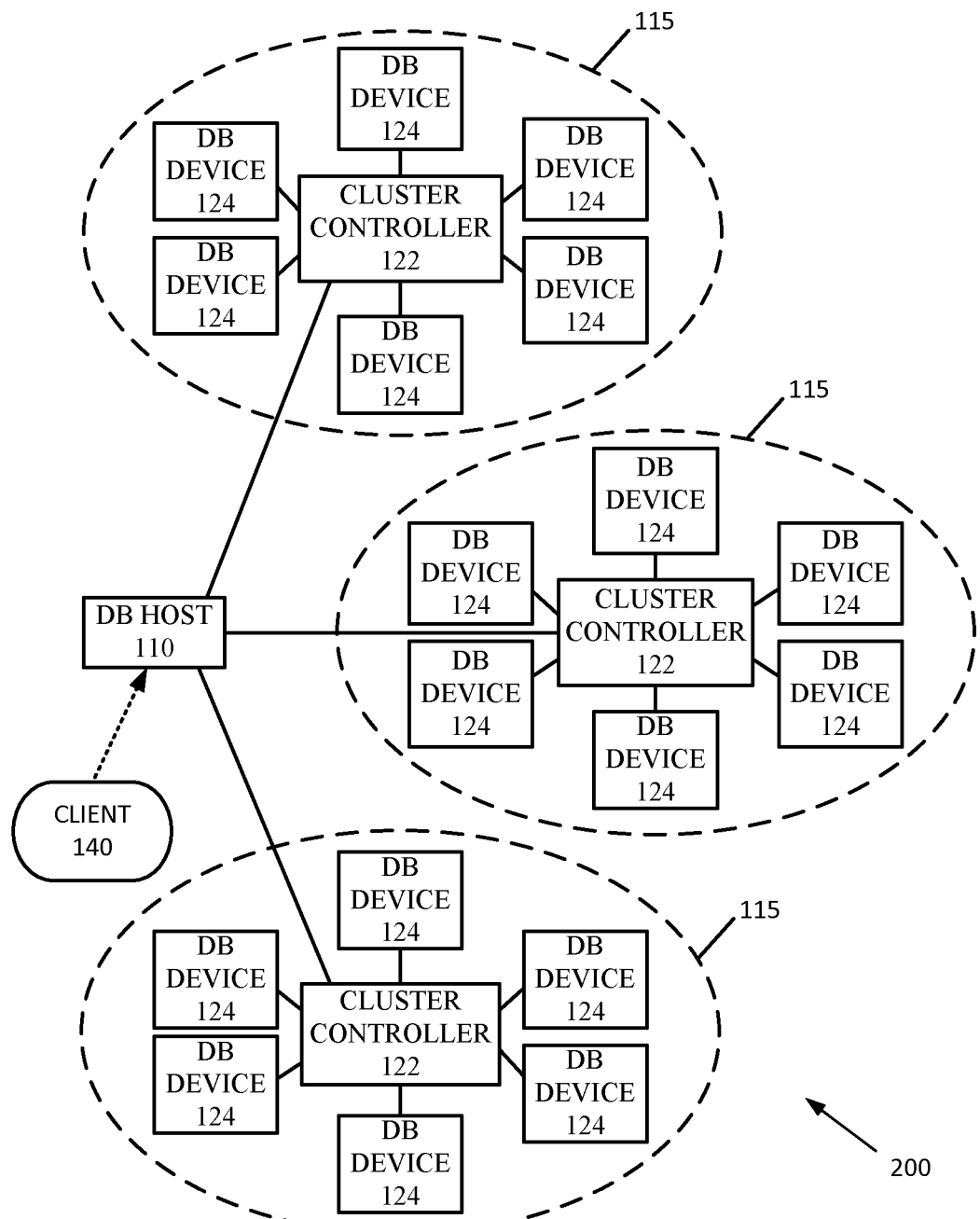
FIG. 2 is an example of a MPP DB including DB devices organized into clusters.

FIG. 2 is an example of a MPP DB 200 including DB devices 124 organized into clusters 115. A DB host 110 is in communication with one or more clusters 115. The DB host 110 in some embodiments is configured to interact with a client or clients 140. The DB host 110 is configured to initiate, monitor, and control database operations in some examples. The DB host 110 and the DB devices 124 in some examples are the same as in FIG. 1.

Each cluster 115 includes a cluster controller 122 coupled to or in communication with multiple DB devices 124. The cluster controller 122 in some embodiments performs communications with the DB host 110. Each DB device 124 includes a storage for storing DB contents. A DB device 124 can further include one or more processors, and consequently the DB device 124 can perform processing of data stored in the associated storage. The DB device 124 can receive a portion of a job data and the DB device 124 can process a portion of a processing job. Each DB device 124 can share data/results with other DB devices 124 of a cluster 115, as appropriate. Each DB device 124 can provide processing results to the DB host 110 via the associated cluster controller 122.

The MPP DB 200 in the embodiment shown includes a DB host 110 that is coupled to DB processing devices or systems, such as DB processing clusters 115. It should be understood that alternatively or additionally the DB host 110 may be coupled to individual DB devices 124. The DB host 110 in some examples receives a DB processing job from the client 140, prepares, initiates, and controls DB processing jobs in the DB processing clusters 115, communicates with and coordinates the DB processing clusters 115, monitors the DB processing clusters 115 for faults or failures, receives a processing job completion indication, and assembles and transfers a completed DB processing job back to the client 140.

A DB processing cluster 115 comprises a number of DB devices 124 in communication with a cluster controller 122. The DB processing cluster 115 can include any number of DB devices 124. The cluster controller 122 in some embodiment exchanges all communications between the DB processing cluster 115 and the DB host 110. Alternatively, in other embodiments the DB devices 124 may directly exchange communications with the DB host 110. Each DB device 124 comprises a DB processing instance, including a physical processing machine, a virtual processing machine, a processing software (including a processing software of multiple processing software instances operating in a multi-threaded (i.e., an interlinked and coordinated) processing environment. Each DB device 124 performs processing of a portion of a processing job, where the processing job is distributed over (and performed by) multiple processing devices/processing instances. This includes job data that is distributed over multiple DB devices 124.

However, in very large DB processing jobs, it is highly unlikely that each DB device can process its own data portion in isolation. Commonly, the processing of one particular data portion will result in changes to one or more other data portions being processed on other DB devices/DB instances. Consequently, a processing error or processing failure in one DB device/DB instance can and will affect other DB devices/DB instances.

Very often, operations in a MPP DB deal with a large data volume. A large number of instances (including servers) can be involved in a processing operation. Typically, during a data redistribution process, a large data job is distributed to a number of datanodes, and then may later be redistributed as needed, such as to level the processing load, to take account of failures or lagging performance in some processing nodes, to change the time required for execution, or to accommodate changes in processing capacity in the MPP DB. The processing operation may take a long time and consume a lot of computation and storage resources. Individual instance failure is likely to happen during processing. When any datanode fails during a redistribution process, the entire process fails and has to be restarted from where the transaction has started. Repeating the operation after individual instance failure can be a waste of processing time and resources.

Optionally, in the method, initiating the data redistribution operation of moving data from a data source to a data destination may be carried out by a coordination thread running in a coordinator node, in a datanode, or in a Gauss data server (GDS), for example.

Figure 3:
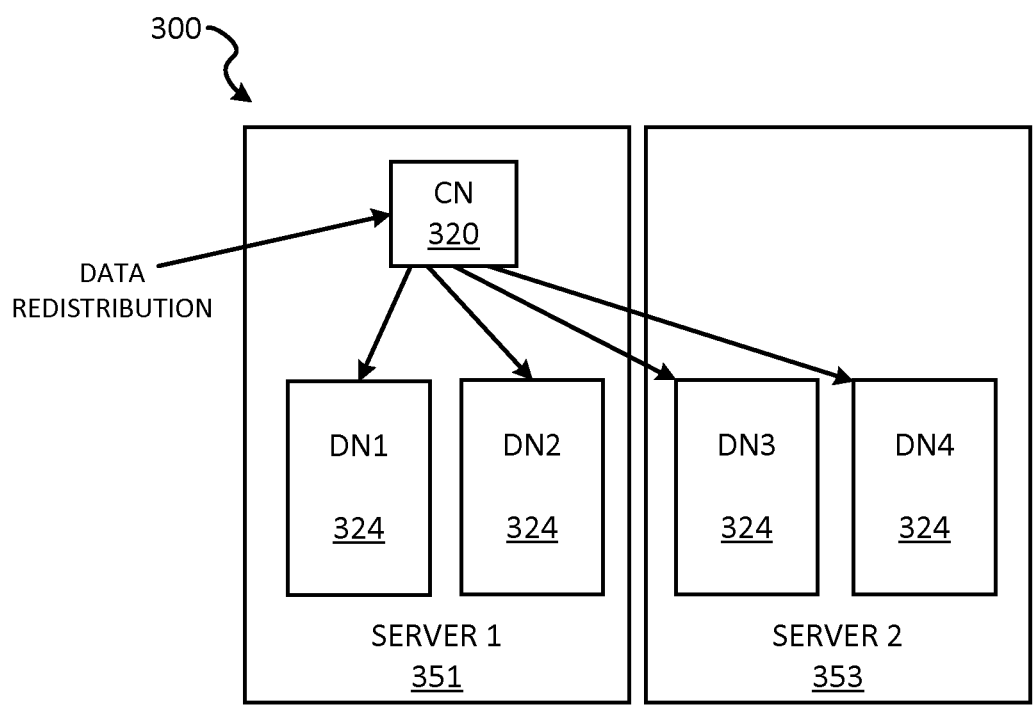
FIG. 3 is an example a MPP DB.

FIG. 3 is an example a MPP DB 400. The MPP DB 400 in this example includes one or more servers, such as the servers 351 and 353. In different servers there can be one or more coordinator nodes 320 and one or more datanodes 324. For example, the DN1 424, the DN2 324, and the CN 320 are located in server 1 351 in this example, while the DN3 324 and the DN 4 324 are located in server 2 353. When a query or data redistribution command is issued, the query or command goes to the CN 320. The CN 320 can interpret the query or command and sends the query or command to the related DNs 324, as appropriate. Such process is done within one transaction. If any sub-process in any DNs fails in the process of the single transaction, the entire transaction will fail.

Figure 4:
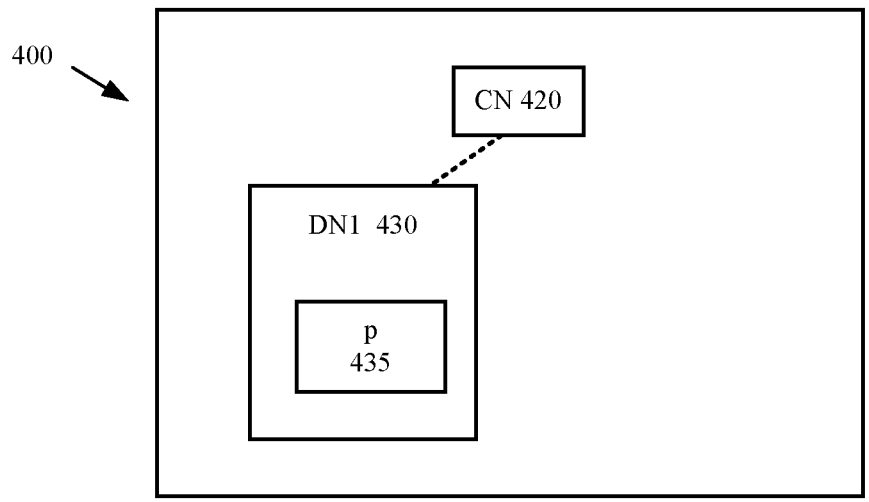
FIG. 4 shows a MPP DB before a data redistribution process.

FIG. 4 shows a MPP DB 400 before a data redistribution process. The MPP DB 400 can comprise an embodiment similar to the MPP DB 100, 200 or 300, and may have the same or similar components. The MPP DB 400 in the example shown includes a coordinator node (CN) 420 and a first data node 1 (DN1) 430. The first DN1 430 can comprise a server or physical machine or can alternatively comprise a DB processing instance instantiated on a server or physical machine. The first DN1 430 can comprise a DB device 124 in FIG. 1 or 2 or can comprise a DB device 324 in FIG. 3. The CN 420 can facilitate or control at least some operations in the MPP DB 400, such as operations in the first DN1 430. It should be understood that the CN 420 may be instantiated on the same or separate server or physical machine from the first DN1 430. The first DN1 430 and/or the CN 420 can comprise components of a cluster 115, as shown in FIG. 2. It should be understood that the MPP DB 400 will typically include more than one DN, but only one DN is shown here for simplicity.

The first DN1 430 includes a job data p 435. The job data p 435 may be large. The job data p 435 will be redistributed, such as to facilitate or speed up processing. The redistribution may transfer some or all of the job data p 435 to another DN for processing.

Figure 5:
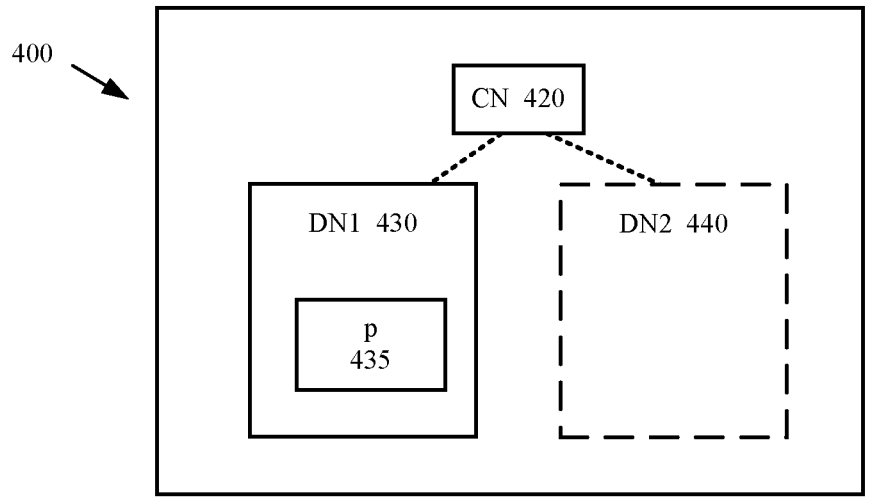
FIG. 5 shows the MPP DB where at least one additional DN2 is shown in dashed lines.

FIG. 5 shows the MPP DB 400 where at least one additional DN2 440 is shown in dashed lines. The at least one additional DN2 440 is being added to the MPP DB 400 (or provisioned) for the current processing job. The at least one additional DN2 440 can comprise a server or physical machine or can alternatively comprise a DB processing instance instantiated on a server or physical machine. The at least one additional DN2 440 can comprise a DB device 124 in FIG. 1 or 2 or can comprise a DB device 324 in FIG. 3.

However, the MPP DB 400 must first prepare for the redistribution before the at least one additional DN2 440 can receive a portion of the job data p 435 and begin processing. Alternatively, the data redistribution can be performed to at least one already instantiated DN.

If a fault occurs in the redistribution, or if the redistribution causes a fault, the MPP DB 400 must be able to recover. The data redistribution should not cause improper processing or operation of the at least one additional DN2 440. The data redistribution should not cause faults in the processing or operation of the first DN1 430. More importantly, the data redistribution should not cause faults in other DB devices/DB instances that are also involved in the processing job.

Figure 6:
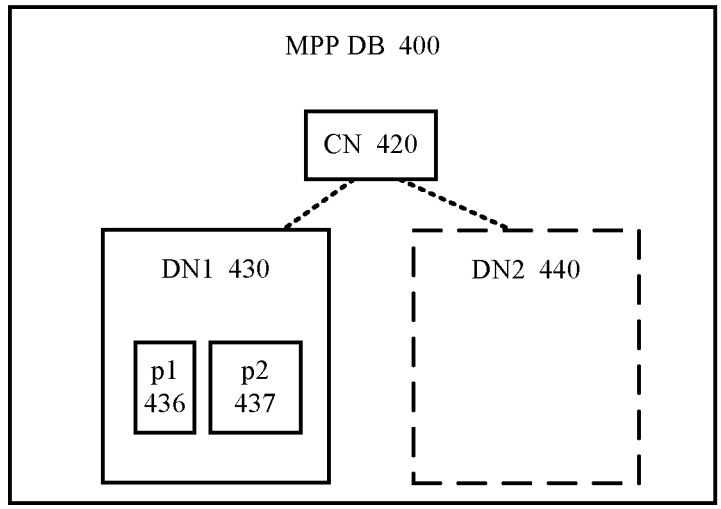
FIG. 6 shows the MPP DB where the job data p of the first DN1 has been split in preparation for the data redistribution.

FIG. 6 shows the MPP DB 400 where the job data p 435 of the first DN1 430 has been split in preparation for the data redistribution. In the example shown, the job data p 435 has been split into two portions, a first data portion p1 436 and a redistribution data portion p2 437. The first data portion p1 436 and the redistribution data portion p2 437 may be of equal or different sizes. It should be understood that although the split is shown as dividing the job data p 435 into two portions, the split may divide the job data p 435 into more than two portions, as needed. Further, the split is not necessarily a division of data and instead may comprise an ordering or separation of data or data records via addresses, index numbers, offsets, data types, or any other system for transferring or retrieving specific data or data portions. In yet other embodiments, the entire job data of the first DN1 430 can be redistributed to one or more additional DNs. Alternatively, in other examples the entire job data may be redistributed to another DN or DNs.

Figure 7A:
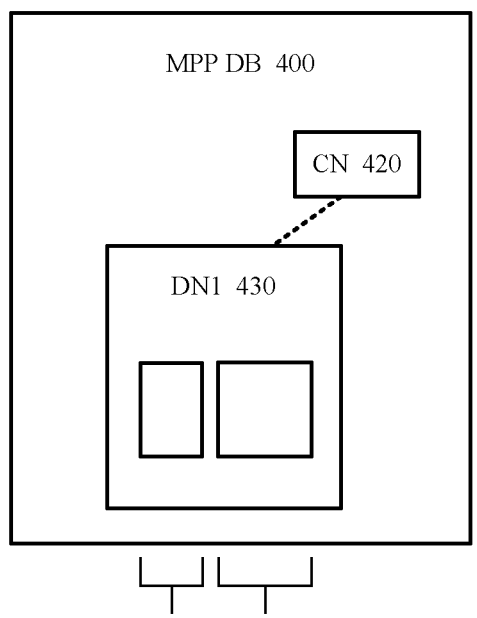
FIG. 7A shows the MPP DB where the job data p is divided into the first data portion p1 and the redistribution data portion p2, for the data redistribution process.

FIG. 7A shows the MPP DB 400 where the job data p 435 is divided into the first data portion p1 436 and the redistribution data portion p2 437, for the data redistribution process. The first data portion p1 436 and the redistribution data portion p2 437 may be the same size or may be of different sized. The first data portion p1 436 is intended to be retained in the first DN1 430 during the data redistribution process in this example. In contrast, the redistribution data portion p2 437 is intended to be transferred to the at least one additional DN2 440 during the data redistribution process in this example.

Figure 7B:
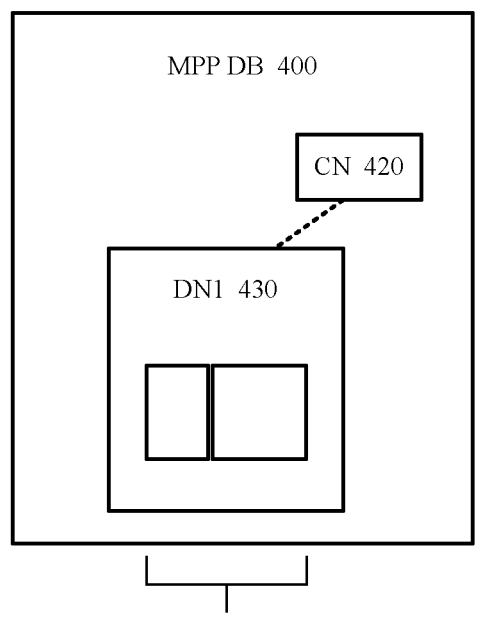
FIG. 7B alternatively shows the MPP DB wherein the entire job data p comprises the redistribution data portion p2.

FIG. 7B alternatively shows the MPP DB 400 wherein the entire job data p 435 comprises the redistribution data portion p2 437. As a result, the entire job data p 435 is intended to be transferred to the at least one additional DN2 440 during the data redistribution process in this example.

Figure 8:
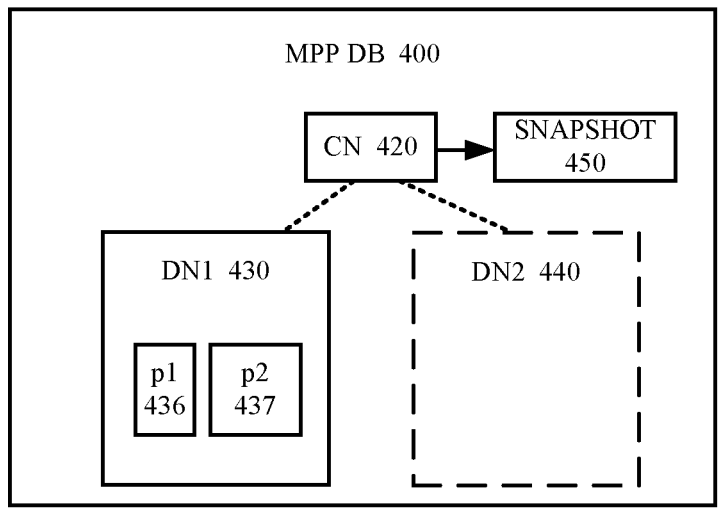
FIG. 8 shows the MPP DB where a snapshot has been recorded.

FIG. 8 shows the MPP DB 400 where a snapshot 450 has been recorded. The snapshot 450 may be recorded in preparation for data redistribution. The snapshot 450 records job data information. The job data information comprises information about and/or from the job data that may be needed to perform a data redistribution operation. The job data information may be needed if the data redistribution fails, if the data redistribution succeeds, or in both cases of data redistribution success and failure. The job data information in some examples comprises information about the split of the job data. The job data information in some examples comprises information that enables part or all of the job data to be redistributed. In addition, the job data information may enable recovery of proper operational status if the data redistribution fails.

In some embodiments, the job data information recorded within the snapshot comprises an address, addresses, or address range of the job data or of a portion or portions of the job data. In some embodiments, the job data information comprises a record number, record numbers, or record number range of the job data or of a portion or portions of the job data. In some embodiments, the job data information comprises an index number, index numbers, or index range of the job data or of a portion or portions of the job data. In some embodiments, the job data information comprises an offset number, offset numbers, or offset range of the job data or of a portion or portions of the job data. In some embodiments, the job data information comprises a starting point and an ending point of the job data or of a portion or portions of the job data.

The snapshot 450 may be recorded by the CN 420, by the first DN1 430, or by any other suitable component or facility of the MPP DB 400. The snapshot 450 may be held in the CN 420, in the first DN1 430, or in any other suitable component or facility of the MPP DB 400.

Figure 9:
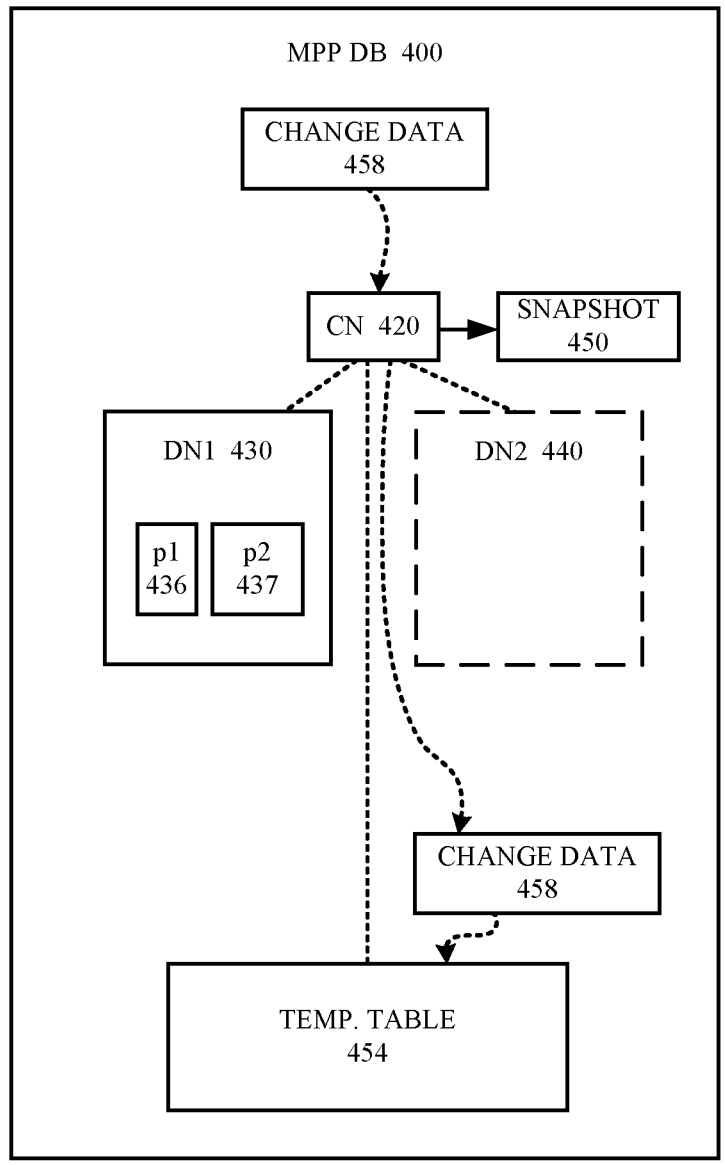
FIG. 9 shows the MPP DB where the first DN1 continues to perform job processing even as the MPP DB prepares for data redistribution.

FIG. 9 shows the MPP DB 400 where the first DN1 430 continues to perform job processing even as the MPP DB 400 prepares for data redistribution. Because the job data in this example has already been split into the first data portion p1 436 and the redistribution data portion p2 437, changes to the job data must be saved and preserved until completion of the data redistribution. Consequently, changes to the job data are accumulated to and saved in a temporary table 454. Changes to either the first data portion p1 436 or to the redistribution data portion p2 437 are saved to the temporary table 454. Changes to the job data can be saved to the temporary table 454 for the duration of the data redistribution operation. The temporary table 454 can be located in the CN 420, in the first DN1 430, or in any other suitable component or facility of the MPP DB 400.

Figure 10:
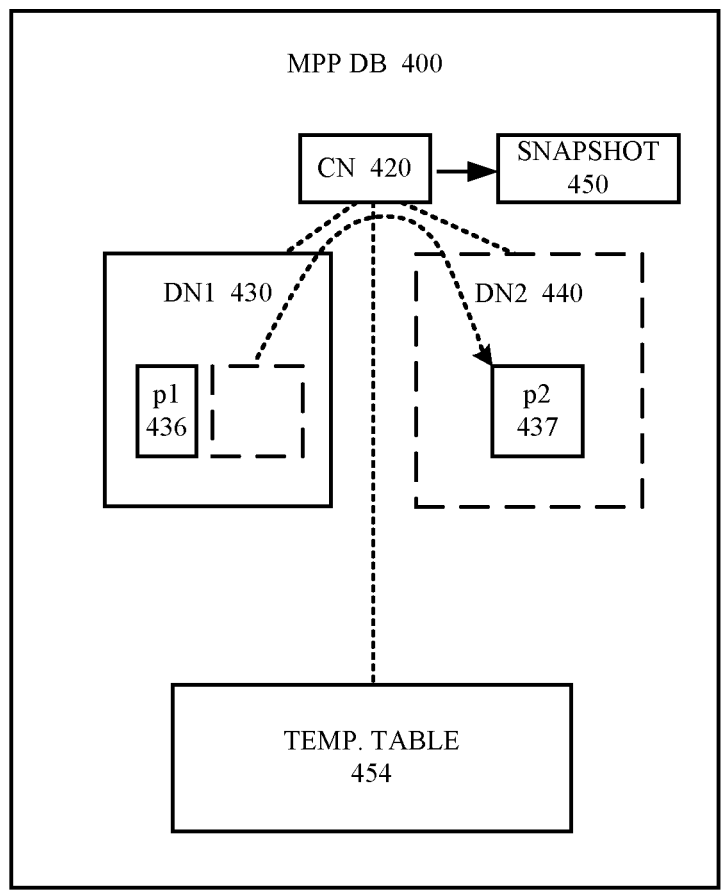
FIG. 10 shows the MPP DB where the redistribution data portion p2 is transferred to the at least one additional DN2.

FIG. 10 shows the MPP DB 400 where the redistribution data portion p2 437 is transferred to the at least one additional DN2 440. The redistribution data portion p2 437 in the first DN1 430 is shown in dashed lines to indicate the transfer, but it should be understood that the transfer may comprise a copy of the redistribution data portion p2 437 and the redistribution data portion p2 437 is not necessarily removed from the first DN1 430.

Figure 11:
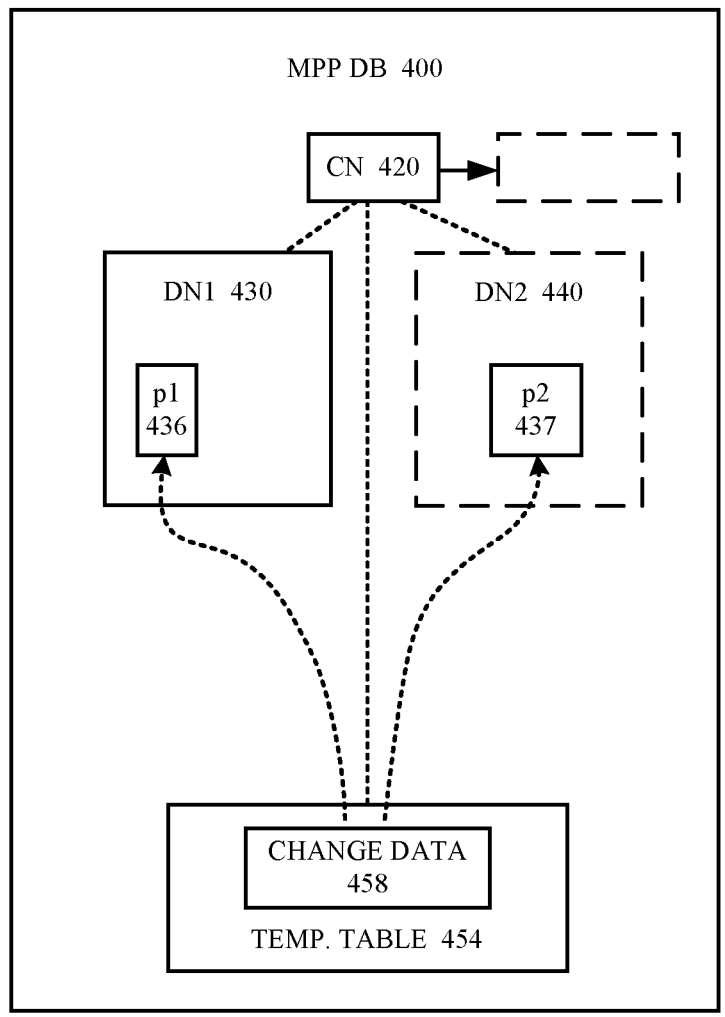
FIG. 11 shows the MPP DB where the data redistribution has succeeded.

FIG. 11 shows the MPP DB 400 where the data redistribution has succeeded. As a consequence of the data redistribution success, the change data 458 is installed into the job data. The changes that occurred to the first data portion p1 436 are installed in the first data portion p1 436, still in the first DN1 430. The changes that occurred to the redistribution data portion p2 437 are installed in the redistribution data portion p2 437, now in the at least one additional DN2 440. Then, the at least one additional DN2 440 can begin processing the redistribution data portion p2 437. Advantageously, the first DN1 430 has been able to continue processing of the job data, where changes to the first data portion p1 436 are retained in the first DN1 430 and changes to the redistribution data portion p2 437 are transferred to the at least one additional DN2 440.

If the data redistribution fails, the original job data can be recovered. Further, according to any of the embodiments and examples herein, changes to the job data occurring after the data redistribution process begins are also captured and retained. In the event of data redistribution failure, the job data is still retained in the first DN1 430 (same as the job data p 435 in FIG. 4). All changes in the change data 458 are then installed in the first data portion p1 436, wherein the first DN1 430 can continue processing. No data or data changes are lost. Processing time is not lost, especially since the first DN1 430 can continue processing even as the data redistribution process is ongoing.

Figure 12:
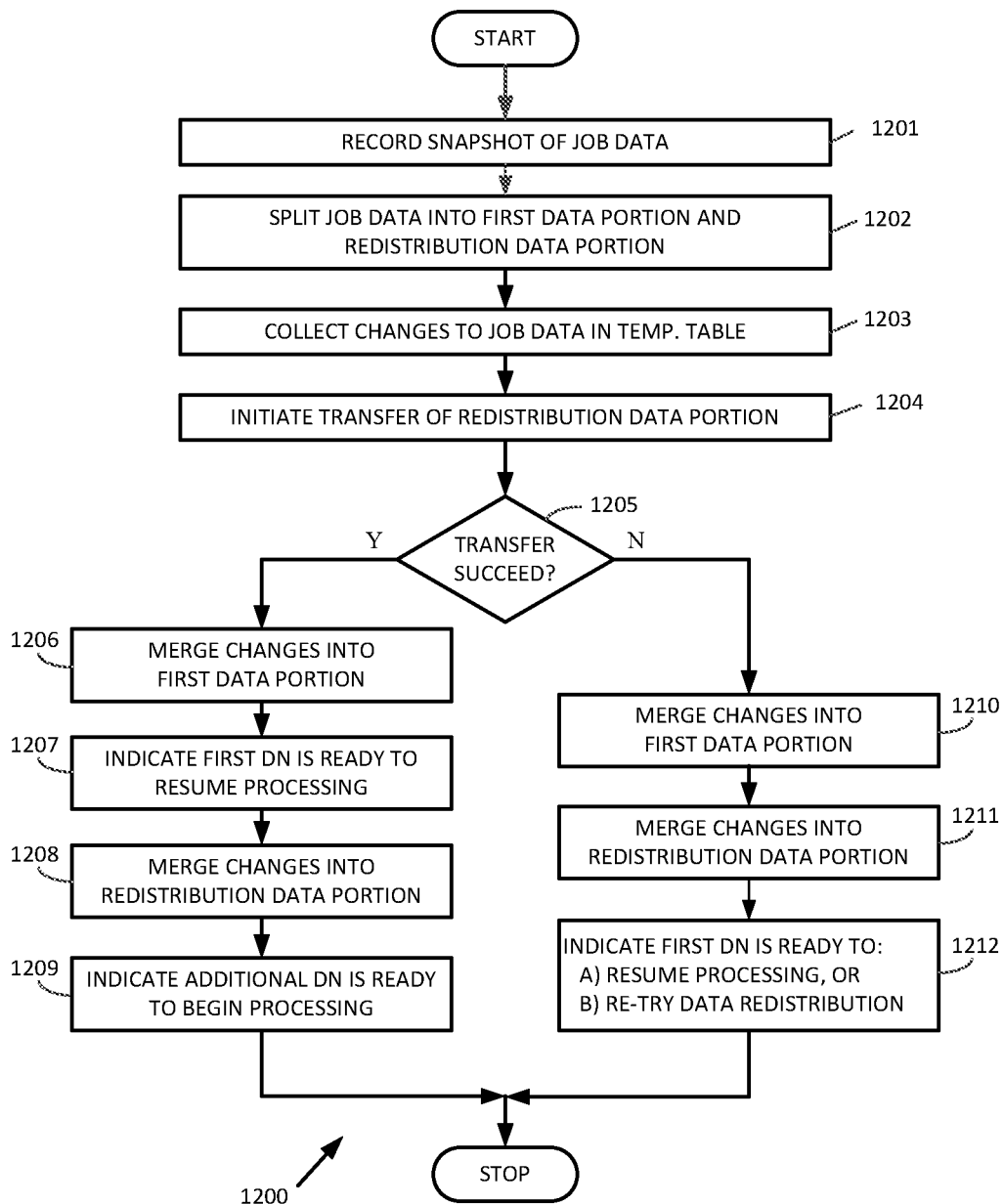
FIG. 12 is a flowchart of a method for data redistribution of a job data in a first DN to at least one additional DN in a MPP DB.

FIG. 12 is a flowchart 1200 of a method for data redistribution of a job data in a first DN to at least one additional DN in a MPP DB. The data redistribution can comprise a redistribution of all or a portion of a job data in a first DN. In addition, the data redistribution can comprise a redistribution of job data from multiple first DNs, a redistribution of job data to at least one additional DN, or can comprise a redistribution of job data from multiple first DNs to at least one additional DN.

In step 1201, a snapshot of job data is recorded. The snapshot comprises job data information that can be used to recover if the data redistribution fails.

In step 1203, changes to the job data are collected and accumulated, such as to a temporary table or other data structure/storage device. The changes may occur due to continued processing of the job data by the first DN. Alternatively, the changes may occur due to continued processing by other DNs, devices, or systems, wherein the processing by the other DNs may cause changes to the job data. In another alternative, the changes are due to processing being performed by the first DN and by other DNs, devices, or systems.

In step 1204, the transfer of at least a portion of the job data is initiated.

In step 1205, if the data redistribution transfer has succeeded, then the method proceeds to step 1206. If the data redistribution transfer has failed, then the method branches to step 1210.

In step 1206, where the data redistribution transfer has succeeded, all changes to the first data portion (accumulated in the temporary table) are merged into the first data portion in the first DN. In some embodiments, the snapshot is used to determine which changes in the temporary table to merge into the first data portion in the first DN. As a result, changes to the first data portion are retained in the first DN.

In step 1207, it is indicated that the first DN can continue processing. The first DN has a complete and current data or data portion.

In step 1208, changes to the redistribution data portion (accumulated in the temporary table) are merged into the redistribution data portion, now in the at least one additional DN. In some embodiments, the snapshot is used to determine which changes in the temporary table to merge into the redistribution data portion in the at least one additional DN. The snapshot in some embodiments can be used to merge redistribution data changes from the temporary table into the at least one additional DN where the transfer has succeeded. The snapshot in some embodiments can be used to merge redistribution data changes accumulated in the temporary table into the first DN, where the transfer has failed. As a result, changes to the redistribution data portion are present in the at least one additional DN.

In step 1209, it is indicated that the at least one additional DN is ready to begin processing. The at least one additional DN has a complete and current data or data portion.

In step 1210, the where the data redistribution transfer has failed, changes to the first data portion (accumulated in the temporary table) are merged into the first data portion still present in the first DN, as previously discussed.

In step 1211, changes to the redistribution data portion (accumulated in the temporary table) are merged into the redistribution data portion still present in the first DN. In some embodiments, the snapshot is used to determine which changes in the temporary table to merge into the redistribution data portion in the first DN. As a result, changes to the redistribution data portion are added to and included in the first DN.

In step 1212, it is indicated that the first DN can continue processing, now with the original job data plus all changes that have occurred since the snapshot was taken. Alternatively, the method can re-try the data redistribution. Further, the method may iteratively process multiple such redistributions.

FIGS. 13A-13E shows flowcharts for a data redistribution process after one or more new servers/instances have been added to a MPP DB according to an embodiment.

Figure 13A:
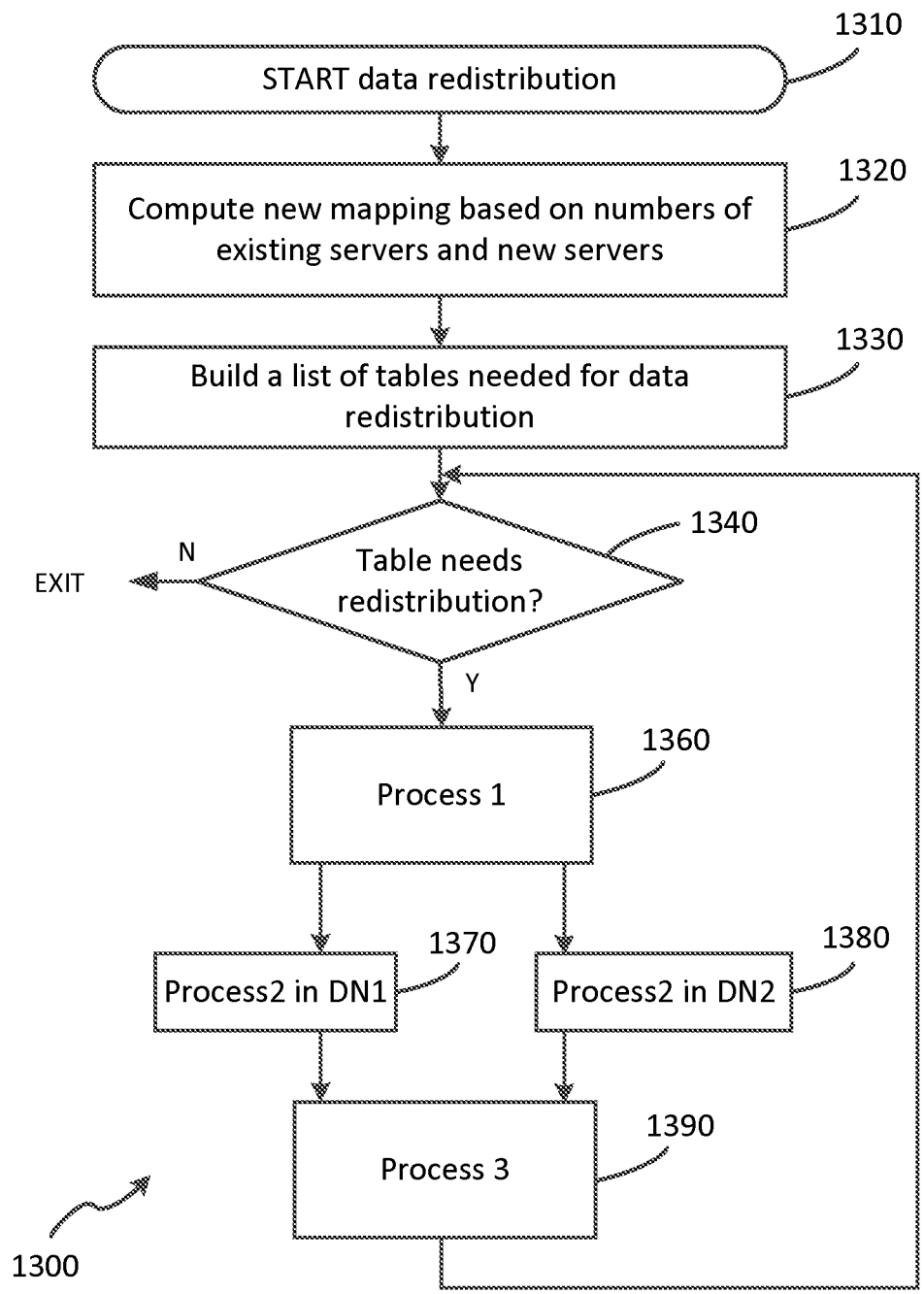
FIG. 13A shows a flowchart for a data redistribution method for data redistribution of a job data in a first datanode DN1 to at least one additional DN in a MPP DB.

FIG. 13A shows a flowchart of a data redistribution method 1300 for data redistribution of a job data in a first datanode DN1 to at least one additional DN in a MPP DB. Step 1310, a data redistribution starts on a MPP DB.

Step 1320, a mapping relationship of a bucket to a server is computed based on numbers of existing servers and new servers.

Step 1330, a list of tables is built to meet the needs for the data redistribution.

Step 1340, when a table needs data redistribution, the flow may proceed to step 1360 (and therefore to Process 1, process 2, and process 3) to carry out a transaction for the data redistribution. Typically, step 1340 occurs after receiving a command or a query from a CN or a DN or another server, triggering or initiating the data redistribution. Alternatively, where data redistribution is not needed, the method exits.

Step 1360 performs a Process 1. Process 1 is further discussed below, in conjunction with FIG. 13B.

Steps 1370 and 1380 perform a Process 2 for a first DN1 and a second DN2. Steps 1370 and 1380 may be performed substantially in parallel. Process 2 is further discussed below, in conjunction with FIG. 13C.

Step 1390 performs a Process 3. Process 3 is further discussed below, in conjunction with FIGS. 13D and 13E.

Figure 13B:
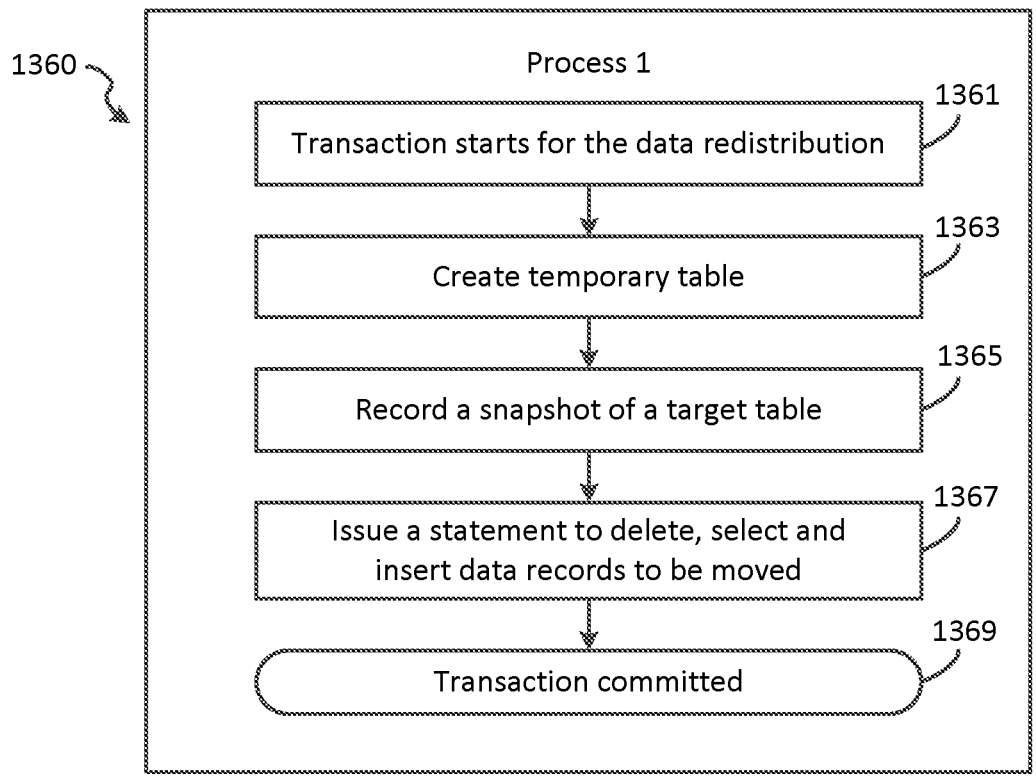
FIG. 13B shows a process 1 for the data redistribution according to an embodiment.

FIG. 13B shows a process 1 for the data redistribution according to an embodiment. Steps 1361-1369 are typically performed when a data redistribution starts for the MPP DB with a new or added server. Process 1 preserves job data, to be used in the event that a data redistribution process succeeds or fails.

Step 1361 comprises the start of a transaction for the data redistribution.

Step 1363 creates a temporary table to be used during the data redistribution.

Step 1365 records a snapshot of a target table, for the target server. Recording a snapshot can also be described as obtaining, taking, etc. The snapshot may be taken, e.g. by the CN or a DN or another server.

Step 1367 issues a statement that can delete, select, and/or insert data records that are to be moved as part of the data redistribution. The statement can be issued to one or more DB devices involved in the data redistribution. As a consequence, data records in original one or more servers or DNs are partitioned into one or more portions of data according to the snapshot of the target table in this example. At least some of the portions of the user data will be redistributed to newly added servers or instances.

In step 1369, the transaction is committed.

Figure 13C:
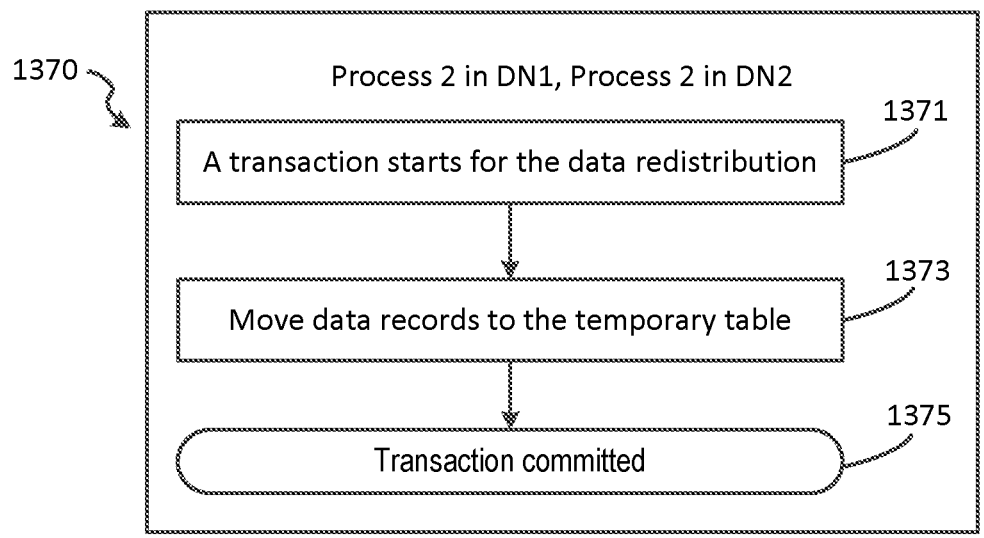
FIG. 13C shows a process 2 for the data redistribution in a DN 1 or a DN2 according to an embodiment.

FIG. 13C shows a process 2 for the data redistribution in a first DN 1 and/or in a second or additional DN2 according to an embodiment. It should be understood that Process 2 can be performed for multiple DNs, as needed. Steps 1371, 1373, and 1375 illustrate that a transaction starts for the data redistribution, and data records are moved according to the snapshot of the target table from the original table to a temporary table. The temporary table is created for the data redistribution. In step 1375, the transaction is committed.

Figure 13D:
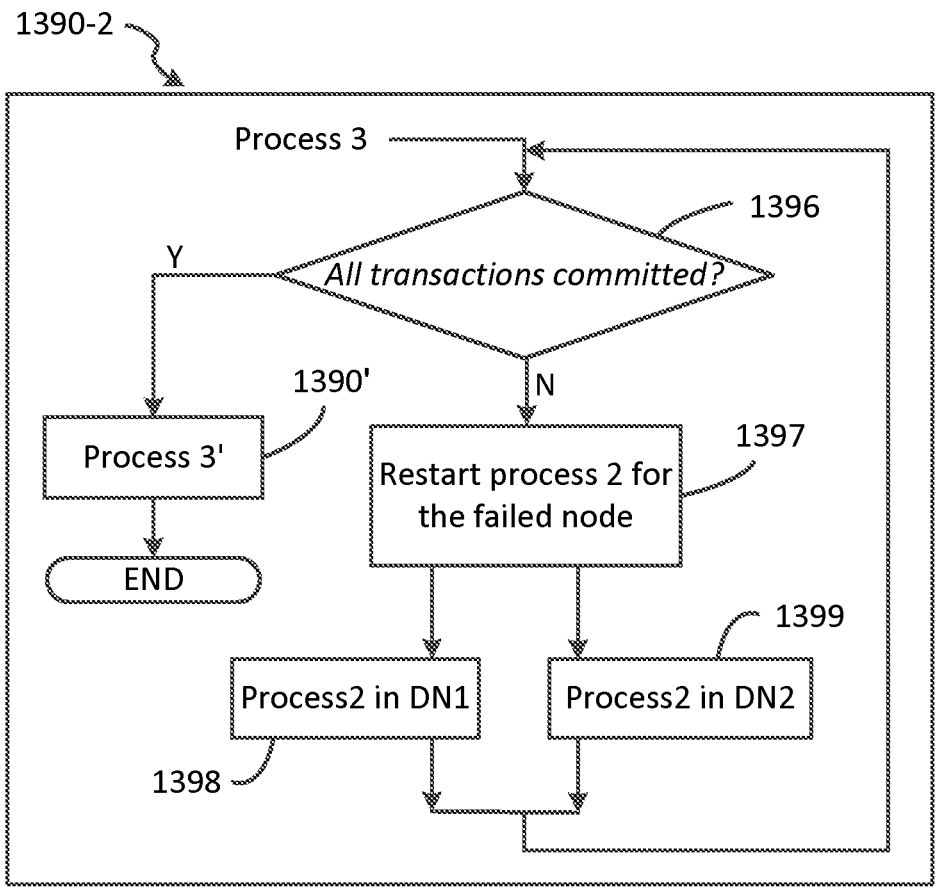
FIG. 13D shows a process 3 for the data redistribution according to an embodiment.

FIG. 13D shows a Process 3 for the data redistribution according to an embodiment. Process 3 iteratively processes all individual data redistributions. Process 3 will continue until all data redistributions have been completed.

Step 1396, if a failure occurs during a data redistribution process for any node of the MPP DB, the Process 2 as described above may be repeated for the failed node. Other Processes 2 for other nodes can continue without being affected.

Step 1396, if all transaction has been committed, proceed with Process 3'.

Figure 13E:
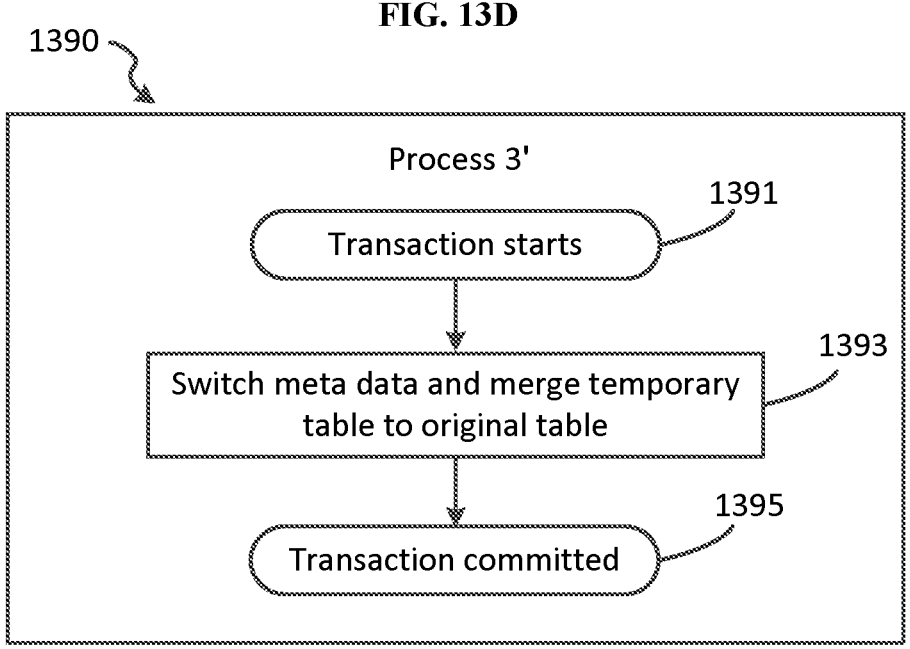
FIG. 13E shows a Process 3' for the data redistribution according to an embodiment.

FIG. 13E shows a Process 3' for the data redistribution according to an embodiment. Process 3' will be performed after all iterations (i.e., all individual data redistributions) have been completed. When all transaction has been committed, meta data is switched between target table and original table, the temporary table is merged with original table to be final target table. The data redistribution process is completed.

Various embodiments are provided additionally which can be combined with any of above mentioned embodiments to carry out the present invention.

A method for data redistribution of moving data from a data source to a data destination in a Massively Parallel Processing (MPP) Database includes: recording a snapshot marking a starting point and an ending point for the data redistribution; issuing a first statement to select one or more data records from the data source based on the snapshot and insert the one or more data records to a temporary table created for the data redistribution; converting the temporary table into a target table created for the data destination; and deleting the temporary table. Optionally the starting point and the ending point is marked by an offset of a file and the file is the data to be moved.

The method may further includes reissuing a second statement to select the one or more data records from the data source based on the same snapshot and insert the one or more data records to the temporary table created for the data redistribution, when a failure occurs in a process of the data redistribution.

The method may further includes recording the snapshot of a base table created for the data redistribution when the base table is locked as read-only.

The method may further includes operating an independent transaction for the data redistribution for each data destination, wherein no interaction is between different transactions. The method may further includes operating a transaction by an instance level for the data redistribution for each data destination and carrying out the recording of the snapshot, the issuing of the first statement and the converting of the temporary table in the transaction.

The method may further includes operating a transaction by an instance level for the data redistribution for each data destination, when the transaction in the instance fails for a first data destination, keep running other transactions in other instances for the data redistribution for the other data destinations. The method may further includes initiating an operation of the data redistribution in an instance-isolated way so that an instance fails in a datanode during the operation of the data redistribution, other instances in other datanodes continue.

Above described method can also be adapted to a system or an apparatus that is configured to be with carrying out the steps as described therein.

Various embodiments discussed herein focus on an approach to resume high-volume data manipulation operations in MPP DB while reserving all the work done by survival instances. The data manipulation operations are, for example, referring to data redistribution after cluster expansion, rebuild index, copy data from file to table, and bulk load operations. By applying the solutions of various embodiments described herein, the MPP DB can restart or rerun the partial job for the failed server or instance, instead of restarting or rerunning the entire data redistribution process. The individual data redistribution results (completed in survival servers or instances) are reserved or reused to complete the redistribution process. With such resumable data manipulation operations, large quantities of work, time, and computational resources are saved.

Example Machine-Readable Medium

Figure 14:
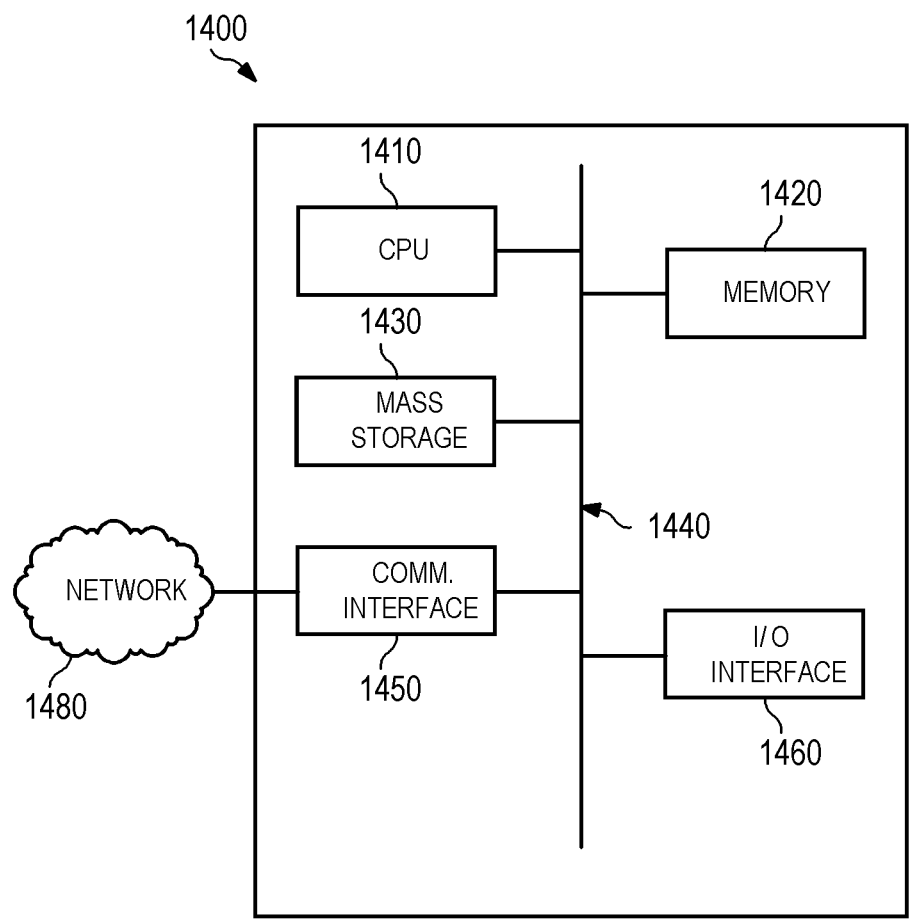
FIG. 14 shows a computing platform that may be used for implementing, for example, the devices and methods described herein, in accordance with any embodiment.

FIG. 14 shows a processing unit 1400 that may be used for implementing, for example, the devices and methods described herein, in accordance with any embodiment. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing unit 1400 may include a central processing unit (CPU) 1410, memory 1420, a mass storage device 1430, and an I/O interface 1460, connected to a bus 1440.

The bus 1440 may be one or more of any type of several bus architectures including a memory bus or memory controller, a peripheral bus, video bus, or the like. The CPU 1410 may comprise any type of electronic data processor.

The memory 1420 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 1420 may include ROM for use at boot-up and DRAM for program and data storage for use while executing programs.

The mass storage 1430 may comprise any type of non-transitory storage device configured to store data, programs, and other information and to make the data, programs, and other information accessible via the bus 1440. The mass storage 1430 may comprise, for example, one or more of a solid state drive, hard disk drive, a magnetic disk drive, an optical disk drive, or the like.

The I/O interface 1460 couples external input and output devices to the processing unit 1400. As illustrated, examples of input and output devices include a speaker, microphone, mouse, touchscreen, keypad, keyboard, printer, display, and the like (not shown) coupled to the I/O interface 1460. Other devices may be coupled to the processing unit 1400, and additional or fewer interface devices may be utilized. For example, a serial interface such as Universal Serial Bus (USB) (not shown) may be used to provide an interface for a printer.

The processing unit 1400 also includes one or more communication interfaces 1450, which may comprise wired links, such as an Ethernet cable or the like, and/or wireless links to access nodes or different networks 1480. The communication interface 1450 allows the processing unit 1400 to communicate with remote units, such as via the network 1480. For example, the communication interface 1450 may provide wireless communication via one or more transmitters and/or one or more receivers (not shown). In an embodiment, the processing unit 1400 is coupled to a local-area network or a wide-area network for data processing and communications with remote devices, such as other processing units, the Internet, remote storage facilities, or the like.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A method for data redistribution of job data in a source data node (DN) to at least one destination DN in a Massively Parallel Processing (MPP) Database (DB), the method comprising:
   recording a snapshot of the job data, the snapshot including job data information;
   splitting the job data of the source DN into a plurality of data portions, the data portions comprising a first data portion in the source DN and a second data portion in the source DN, and the snapshot comprising information about the split of the job data;
   collecting job data copy changes;
   identifying one or more first changes to the first data portion and identifying one or more second changes to the second data portion from the collected changes and based on the snapshot;
   initiating transfer of the second data portion from the source DN to the at least one destination DN;
   determining the data transfer of the second data portion to the at least one destination DN has failed;
   merging the identified one or more first changes into the first data portion in the source DN; and
   merging the identified one or more second changes into the second data portion in the source DN based on the failure of the data transfer of the second data portion to the at least one destination DN.

2. The method of claim 1, wherein the job data copy changes are stored in a temporary table, and the temporary table is located in a coordinator node (CN) of the MPP DB.

3. The method of claim 1, wherein the method further comprises:
   indicating the source DN can continue processing; and
   indicating to re-try the data redistribution.

4. The method of claim 1, further comprising:
   in response to the failure in transferring the second data portion to the at least one destination DN, re-trying the transfer.

5. The method of claim 1, the splitting the job data comprising an ordering or separation of data or data records via addresses, index numbers, offsets, or data types.

6. The method of claim 1, the job data information comprising an address, addresses, or an address range of the job data or of a portion or portions of the job data.

7. The method of claim 1, the job data information comprising a record number, record numbers, or a record number range of the job data or of a portion or portions of the job data.

8. The method of claim 1, the job data information comprising an index number, index numbers or an index range of the job data or of a portion or portions of the job data.

9. The method of claim 1, the job data information comprising an offset number, offset numbers, or an offset range of the job data or of a portion or portions of the job data.

10. The method of claim 1, the information within the snapshot of the job data comprising a starting point and an ending point of the job data or of a portion or portions of the job data.

11. A device for data redistribution of job data in a source data node (DN) to at least one destination DN in a Massively Parallel Processing (MPP) Database (DB), comprising:
   a non-transitory memory storing instructions; and
   at least one processor in communication with the memory, the at least one processor configured, upon execution of the instructions, to perform the following steps:
   record a snapshot of the job data, the snapshot including job data information;
   split the job data of the source DN into a plurality of data portions, the data portions comprising a first data portion in the source DN and a second data portion in the source DN, and the snapshot comprising information about the split of the job data;
   collect job data copy changes;
   identify one or more first changes to the first data portion and identify one or more one or more second changes to the second data portion from the collected changes and based on the snapshot;
   initiate transfer of the second data portion from the source DN to the at least one destination DN;
   determining the data transfer of the second data portion to the at least one destination DN has failed;

merge the identified one or more first changes into the first data portion in the source DN; and merge the identified one or more second changes into the second data portion in the source DN based on the failure of the data transfer of the second data portion to the at least one destination DN.

12. The device of claim 11, wherein the job data copy changes are stored in a temporary table, and the temporary table is located in a coordinator node (CN) of the MPP DB.

13. The device of claim 11, the at least one processor further configured, upon execution of the instructions, to perform the following steps:

indicate the source DN can re-initiate processing; and indicate to re-try the data redistribution.

14. The device of claim 11, the at least one processor further configured, upon execution of the instructions, to perform the following steps:

in response to the failure in transferring the second data portion to the at least one destination DN, re-trying the transfer.

15. The device of claim 11, the splitting the job data comprising an ordering or separation of data or data records via addresses, index numbers, offsets, or data types.

16. The device of claim 11, the job data information comprising an address, addresses, or an address range of the job data or of a portion or portions of the job data.

17. The device of claim 11, the job data information comprising a record number, record numbers, or a record number range of the job data or of a portion or portions of the job data.

18. The device of claim 11, the job data information comprising an index number, index numbers or an index range of the job data or of a portion or portions of the job data.

19. The device of claim 11, the job data information comprising an offset number, offset numbers, or an offset range of the job data or of a portion or portions of the job data.

20. The device of claim 11, the information within the snapshot of the job data information comprising a starting point and an ending point of the job data or of a portion or portions of the job data.

* * * * *

UNITED STATES PATENT AND TRADEMARK OFFICE
CERTIFICATE OF CORRECTION

PATENT NO. : 11,886,284 B2
APPLICATION NO. : 17/746841
DATED : January 30, 2024
INVENTOR(S) : Cai et al.

It is certified that error appears in the above-identified patent and that said Letters Patent is hereby corrected as shown below:

On the Title Page

On page 2, in Column 2, under item (56) "Other Publications", Line 50, delete "Dicionary" and insert --Dictionary-- therefor In the Claims In Column 16, Line 61, in Claim 11, after "identify", delete "one or more one or more" and insert --one or more-- therefor Signed and Sealed this
Ninth Day of April, 2024

Katherine Kelly Vidal
*Director of the United States Patent and Trademark Office*